Patented Apr. 29, 1947

2,419,530

UNITED STATES PATENT OFFICE 2,419,530

PRODUCTION OF HYDANTOIN

Edgar C. Britton, John E. Livak, and Maxton F. Murray, Midland, Mich., assignors to The Dow Chemical Company, Midland, Mich., a corporation of Michigan No Drawing. Application October 23, 1944, Serial No. 560,035

5 Claims. (Cl. 260—309.5)

This invention concerns an improved method for the production of hydantoin.

Hydantoin has heretofore been prepared by heating a solution of hydantoic acid in aqueous hydrochloric acid and evaporating the mixture to dryness to recover the product. It has also been prepared by heating ethyl hydantoate together with an aqueous hydrochloric acid solution and evaporating the resultant mixture to crystallize successive crops of hydantoin. Both methods involve an inconvenient evaporation step which, in industrial practice, would necessitate the use of acid-resistant equipment for withdrawing the acidic vapors and recovering the valuable components thereof, such as the hydrochloric acid and also alcohol when present in the reaction mixture. Hydantoin, prepared by us by the first of the methods just mentioned, was discolored and impure, due apparently to occurrence of partial decomposition of the hydantoin during evaporation of the reaction mixture. The second of the foregoing methods is further disadvantageous in that a relatively expensive ester of hydantoic acid, rather than the acid itself, is used as a starting material and in that the alcohol formed in the reaction must be discarded or extra steps must be employed for its recovery from the acidic aqueous liquor. Accordingly, these usual methods for preparing hydantoin are not well suited to commercial practice.

We have found that such troublesome evaporation steps may be avoided and that crystalline hydantoin may be produced readily and in excellent yield by repeatedly employing an aqueous mineral acid solution as a medium for the reaction to convert hydantoic acid to hydantoin and, after completion of each of the successive reactions, merely cooling to crystallize a portion of the hydantoin which is present and removing the crystals so as to leave the mother liquor saturated with hydantoin. In the first of such series of reactions only a portion of the hydantoin is recovered in crystalline form, e. g., 30 per cent or more of the hydantoin remains dissolved in the mother liquor. However, in each of the successive reactions wherein such mother liquor is used as a medium, hydantoin may be produced and recovered directly as the crystalline compound in excellent yield, e. g., in a yield of 90 per cent of theoretical or higher, without resorting to evaporation of the liquor.

It should be mentioned that repeated employment of the same liquid medium in carrying out other organic reactions usually is not feasible unless steps are taken to purify the medium between successive reactions. Most organic reactions result in formation of a plurality of products and after removing the principal product from a medium for the reaction, by-products usually remain in the medium and accumulate in excessive amount if attempt is made to re-employ the latter directly, i. e., without purification, in again carrying out the reaction.

We have found that under the reaction conditions which we employ, hydantoin is the only organic compound formed in an appreciable amount; hence, that no problem of removing organic by-products arises. However, water is formed in a considerable amount and it has the effect of diluting the aqueous mineral acid solution which is used as the reaction medium. We found, fortunately, that this increase in volume of the aqueous medium does not result in a corresponding increase in the amount of hydantoin which remains dissolved in the medium during the step of crystallizing the product. In other words, although hydantoin is appreciably soluble in water alone, particularly when warm, the solubility of hydantoin in aqueous solutions of strong mineral acids such as hydrochloric, hydrobromic or sulphuric acid, varies with change in the concentration of the acid, the solubility being less, at a given temperature, with decrease in the concentration of the acid. Accordingly, the dilution of the aqueous mineral acid solution by the water formed in the successive reactions for the production of hydantoin does not decrease appreciably the proportion of the hydantoin present which may be crystallized from the reaction mixtures.

Because of the increase in volume of the aqueous mineral acid solution due to dilution by water formed in the successive reactions it becomes necessary eventually to discard or reconcentrate part, or all, of the mineral acid solution. However, such solution may be used four or more times as a medium for the reaction before replacement or reconcentration of the same becomes necessary. When using aqueous sulphuric acid as a medium for the reaction, reconcentration may be accomplished by evaporating a portion of the water therefrom. Since the acid is quite dilute, even after completion of the evaporation, this operation may be accomplished without appreciable decomposition of the hydantoin which remains dissolved in the solution. When an aqueous solution of a volatile mineral acid, e. g., hydrochloric acid, is used as a medium for the reaction, reconcentration may conveniently be effected by discarding a portion of the medium after it has become unduly dilute and adding to the remainder sufficient concentrated acid to bring the acid concentration to the desired value. Due to the fact that the hydantoic acid employed as a starting material often contains a minor amount of inorganic impurities, e. g., soluble metal salts, which tend to accumulate in the mineral acid solution, replacement of the acid solution eventually becomes advisable. However, the acid solution can ordinarily be re-used ten or more times as a medium for the reaction before such impurities accumulate in an objectionable amount.

In practice of the invention, it is necessary that the hydantoic acid be used in an amount, relative to the aqueous mineral acid medium, such as to form sufficient hydantoin to permit crystallization of the same from the reacted mixture and that the aqueous mineral acid be of a concentration such as to permit repeated employment of the same before reconcentration or replacement is required. In the first of the series of successive reactions for the formation of hydantoin, we employ an at least 3, and preferably from 5 to 20, normal aqueous mineral acid solution and we use at least 0.25, usually from 0.5 to 2.0, molecular equivalents of hydantoic acid per chemical equivalent of the mineral acid. The hydantoic acid is preferably employed in amount such as to dissolve completely in the aqueous mineral acid solution, but it may be used in somewhat greater amount provided the mixture is sufficiently fluid to permit ready stirring of the same. Hydrochloric acid of normality between 5 and 13 is usually employed as the mineral acid. However, other mineral acids such as sulphuric or hydrobromic acid may be used.

The mixture of hydantoic acid and the aqueous mineral acid solution in the proportions just stated is heated, e. g., at from 80° to 130° C., preferably from 90° to 110° C., to effect the dehydration of hydantoic acid to form hydantoin. Usually the reaction is carried out by heating the mixture under reflux and at atmospheric pressure to temperatures between 90° and 100° C. for from 2 to 3 hours, but it may be carried out in a closed vessel and at higher temperatures and pressures, if desired.

After completing the reaction, the mixture is cooled to crystallize hydantoin therefrom and the crystalline product is separated, washed free of adhering mother liquor and dried. Any of a variety of liquids, e. g., water, acetone, or methyl or ethyl alcohol, etc., may be used in the washing operation. The temperature to which the mixture need be cooled to cause crystallization of the hydantoin is of course dependent on the concentration of the hydantoin in the mixture, e. g., when the reaction mixture is rich in hydantoin the crystallization may in some instances be accomplished at temperatures as high as 50° C. or thereabout. Usually the crystallization is accomplished by cooling the reaction mixture to room temperature or lower, preferably to a temperature between the freezing point of the mixture and 10° C.

The mother liquor remaining after removal of the crystalline hydantoin is, when at the crystallizing temperature, saturated with hydantoin. It is admixed with a fresh quantity of hydantoic acid and the resulting mixture is heated, as described above, to form a further amount of hydantoin which is crystallized by cooling the reacted mixture. Because of the fact that the mineral acid solution employed in this second reaction was initially saturated with hydantoin and because of the fact that the water formed together with the hydantoin does not cause more than a minor increase in the amount of hydantoin which, at the crystallizing temperature, may remain dissolved in the aqueous mineral acid solution, nearly all of the hydantoin which is formed in this second reaction is readily crystallized from the mixture. After removing the crystalline product, the mother liquor may be re-used as a medium for the conversion of a further amount of hydantoic acid to hydantoin.

The following examples describe certain ways in which the principle of the invention has been employed, but are not to be construed as limiting its scope.

*Example 1*

A solution of 1770 grams (15 moles) of hydantoic acid in 1307 cubic centimeters of aqueous hydrochloric acid of 36 per cent concentration was heated under reflux at temperatures of between 90° and 95° C. for 3 hours. After the first hour of heating crystallization of the hydantoin formed in the reaction was observable. The mixture was diluted by adding 450 cubic centimeters of water, cooled to 8° C. and filtered. The crystalline hydantoin thus separated was washed with 750 cubic centimeters of ethyl alcohol and dried. There was obtained 1078 grams (19.78 moles) of pure, white, crystalline hydantoin. The yield of the crystalline product was 71.8 per cent of theoretical, based on the hydantoic acid initially employed. The mother liquor from the crystallization remained, of course, saturated with hydantoin.

*Example 2*

A mixture of 472 grams (4 moles) of hydantoic acid and 664 grams of the mother liquor from which hydantoin was crystallized in Example 1 was heated under reflux at 90° C. for 2.5 hours. The mixture was then cooled to 8° C. and hydantoin which had crystallized therefrom was separated by filtration, washed with 800 cubic centimeters of ethyl alcohol and dried. There was obtained 388 grams (3.88 moles) of pure, white, crystalline hydantoin. The yield of the crystalline product was 97 per cent of theoretical, based on the hydantoic acid. Accordingly, practically all of the hydantoin formed in this second reaction was recovered in crystalline form. The mother liquor remaining after removing the crystalline product was suitable for re-employment as a medium for the reaction to form hydantoin.

As many as four successive reactions for the conversion of hydantoic acid to hydantoin have been carried out in the same aqueous mineral acid solution, i. e., using the mother liquor from the crystallization of the hydantoin in one reaction as the medium for the next reaction. The yield of pure crystalline hydantoin in the fourth reaction was greater than 90 per cent of theoretical and the mother liquor from which the crystalline product was separated was suitable for further use in the process.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method for the production of hydantoin, the steps of heating hydantoic acid together with an at least 3 normal aqueous mineral acid solution, in amount such as to contain not more than 4 chemical equivalents of the mineral acid per molecular equivalent of the hydantoic acid, to a reaction temperature between 80° and 130° C., thereafter cooling the mixture to crystallize hydantoin therefrom, separating the crystalline hydantoin from the acidic mother liquor, adding hydantoic acid to the mother liquor, heating the resulting mixture to a reaction temperature between 80° and 130° C., cooling to crystallize hydantoin, and separating the crystalline hydantoin.

2. The method, as described in claim 1, wherein the aqueous mineral acid solution is a hydrochloric acid solution of between 5 and 13 normality.

3. The method, as described in claim 1, wherein the aqueous mineral acid solution is a hydrochloric acid solution of between 5 and 13 normality and the reaction is carried out by heating the reaction mixture under reflux and at approximately atmospheric pressure to a temperature above 80° C.

4. The method as described in claim 1, wherein the aqueous mineral acid solution is a sulphuric acid solution of between 5 and 20 normality.

5. The method, as described in claim 1, wherein the aqueous mineral acid solution is a sulphuric acid solution of between 5 and 20 normality and the reaction is carried out by heating the reaction mixture under reflux and at approximately atmospheric pressure to a temperature above 80° C.

EDGAR C. BRITTON.
JOHN E. LIVAK.
MAXTON F. MURRAY.

REFERENCES CITED

The following references are of record in the file of this patent:

UNITED STATES PATENTS

| Number | Name | Date |
|---|---|---|
| 1,940,611 | Strosacker et al. | Dec. 19, 1933 |
| 2,286,559 | McAllister | June 16, 1942 |
| 2,322,915 | Brooks | June 29, 1943 |

OTHER REFERENCES

Organic Chemistry, P. Karrer, 1938.